US007162665B2

(12) United States Patent
Masuda et al.

(10) Patent No.: US 7,162,665 B2
(45) Date of Patent: Jan. 9, 2007

(54) INFORMATION PROCESSING SYSTEM, METHOD FOR OUTPUTTING LOG DATA, AND COMPUTER-READABLE MEDIUM STORING A COMPUTER SOFTWARE PROGRAM FOR THE SAME

(75) Inventors: Haruki Masuda, Yokohama (JP); Shinya Takeuchi, Yokohama (JP); Shotaro Ohno, Yamato (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 10/785,759

(22) Filed: Feb. 23, 2004

(65) Prior Publication Data

US 2004/0236764 A1 Nov. 25, 2004

(30) Foreign Application Priority Data

Feb. 28, 2003 (JP) ............................. 2003-052735

(51) Int. Cl.
G06F 11/00 (2006.01)
(52) U.S. Cl. ........................................ 714/45; 702/183
(58) Field of Classification Search .................... None
See application file for complete search history.

(56) References Cited

U.S. PATENT DOCUMENTS

| 6,173,418 | B1 | 1/2001 | Fujino et al. | |
|---|---|---|---|---|
| 6,182,243 | B1* | 1/2001 | Berthe et al. | 714/38 |
| 6,192,365 | B1 | 2/2001 | Draper et al. | |
| 6,289,379 | B1* | 9/2001 | Urano et al. | 709/223 |
| 6,470,388 | B1* | 10/2002 | Niemi et al. | 709/224 |
| 6,480,886 | B1* | 11/2002 | Paice | 709/208 |
| 6,604,183 | B1 | 8/2003 | Beaven et al. | |
| 6,769,079 | B1* | 7/2004 | Currey et al. | 714/45 |
| 6,802,067 | B1* | 10/2004 | Camp et al. | 719/315 |
| 6,951,012 | B1* | 9/2005 | McGeorge, Jr. | 717/124 |
| 7,032,019 | B1* | 4/2006 | Noguchi et al. | 709/224 |
| 2003/0005173 | A1* | 1/2003 | Shah et al. | 709/318 |
| 2003/0196188 | A1 | 10/2003 | Kuzmin | |
| 2003/0208464 | A1 | 11/2003 | Lee et al. | |
| 2005/0028171 | A1 | 2/2005 | Kouglouris et al. | |

FOREIGN PATENT DOCUMENTS

JP 408179974 A * 7/1996
JP 11-296415 10/1999

* cited by examiner

*Primary Examiner*—Gabriel L. Chu
(74) *Attorney, Agent, or Firm*—Townsend and Townsend and Crew LLP (57) ABSTRACT

The present invention relates to a program for causing an information processing device in an information processing system including the information processing device to execute the steps of: executing at least one processing block executed in common when at least two types of commands for controlling the information processing system are respectively executed; storing determination values which are set for the respective types of the commands and which are used to determine whether log data to be outputted by executing the processing block needs to be outputted; and storing results of determining whether the determination values satisfy a log data output condition set for the processing block when the processing block containing an algorithm for outputting the log data is executed.

15 Claims, 7 Drawing Sheets

| PROCESSING BLOCK NAME | LEVEL | TYPE | LOG MESSAGE |
|---|---|---|---|
| A | 2 | ERROR | EXECUTE PROCESSING BLOCK A |
| B | 3 | TRACE | EXECUTE PROCESSING BLOCK B |
| C | 1 | TRACE | EXECUTE PROCESSING BLOCK C |
| ⋮ | ⋮ | ⋮ | ⋮ |

| COMMAND NAME | THRESHOLD LEVEL |
|---|---|
| makeLDEV | 1 |
| deleteLDEV | 3 |
| makePath | 2 |
| ⋮ | ⋮ |

| THREAD ID | THRESHOLD LEVEL |
|---|---|
| 4321A | 1 |
| 1234B | 2 |
| 5678C | 3 |
| ⋮ | ⋮ |

INFORMATION PROCESSING SYSTEM, METHOD FOR OUTPUTTING LOG DATA, AND COMPUTER-READABLE MEDIUM STORING A COMPUTER SOFTWARE PROGRAM FOR THE SAME

CROSS-REFERENCE TO RELATED APPLICATIONS

The present application claims priority upon Japanese Patent Application No. 2003-52735 filed on Feb. 28, 2003, which is herein incorporated by reference.

BACKGROUND OF THE INVENTION

1. Field of the Invention

The present invention relates to a program, an information processing device, and a method for outputting log data in the information processing device.

2. Description of the Related Art

With the advancement in information technology in recent years, information processing systems have been enlarged and have become complicated. The amount of log data outputted as history information of the execution of information processing systems has also been increased accordingly. (e.g., refer to Japanese Patent Application Laid-open Publication No. Hei 11(1999)-296415).

However, not all of the outputted log data are equally needed. Therefore, it is important to make it possible to appropriately acquire log data as needed.

SUMMARY OF THE INVENTION

The present invention has been achieved in consideration of the above-described problem. A main object of the present invention is to provide a program, an information processing device, and a method for outputting log data in the information processing device.

In order to solve the aforementioned problem, a program according to the present invention causes an information processing device in an information processing system including the information processing device to execute the steps of: executing at least one processing block executed in common when at least two types of commands for controlling the information processing system are respectively executed; storing determination values which are set for the respective types of the commands and which are used to determine whether log data to be outputted by executing the processing block needs to be outputted; and storing results of determining whether the determination values satisfy a log data output condition set for the processing block when the processing block containing an algorithm for outputting the log data is executed.

Here, a command means information for designating a process performed in the information processing device. A command may be inputted from the outside into the information processing device or may be generated inside the information processing device. Moreover, a processing block is a unit of a process executed when a command is executed. A process designated by a command is realized by executing at least one processing block.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Hereinafter, an embodiment of the present invention will be described in detail using the accompanying drawings.

Figure 1:
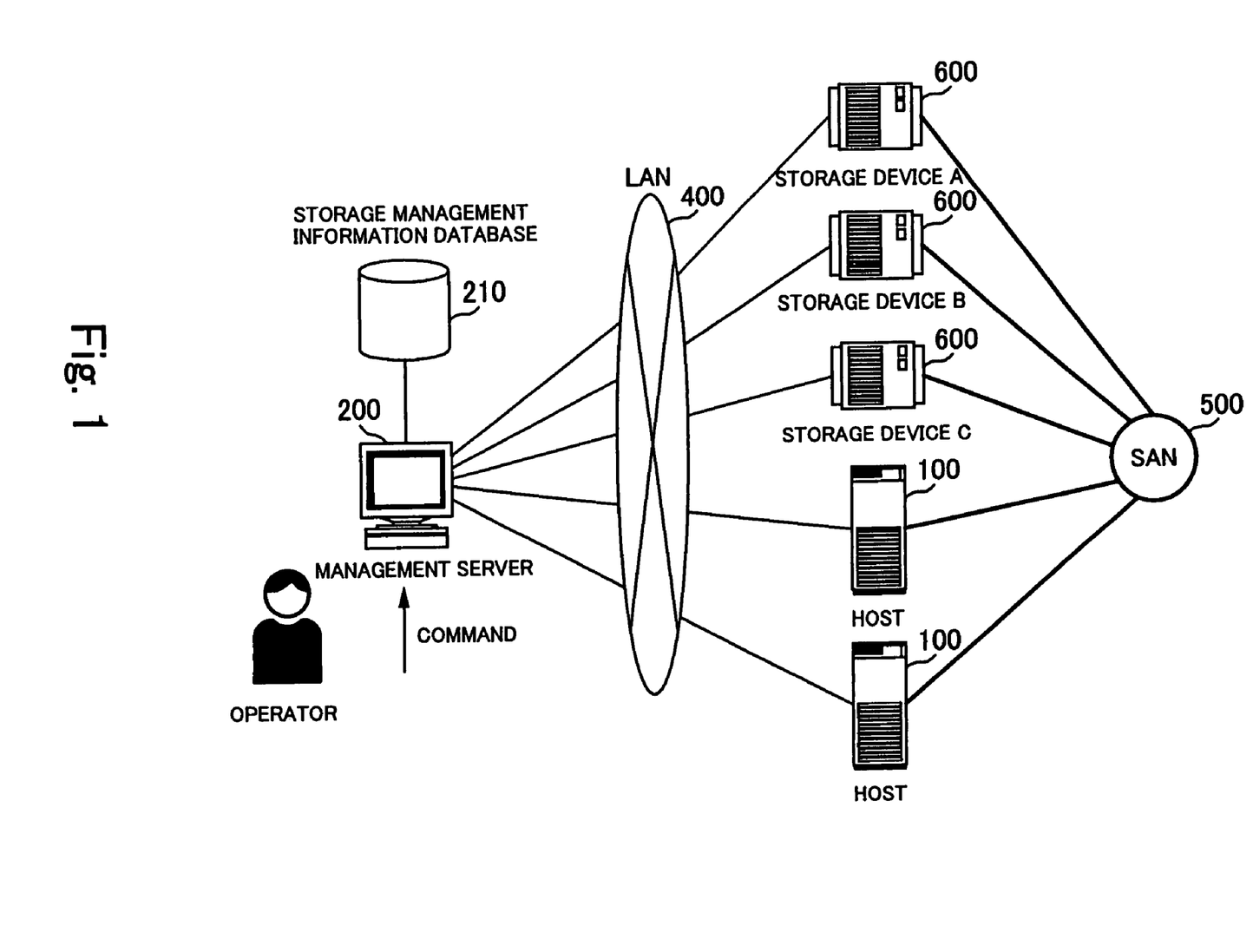
FIG. 1 is a block diagram showing the entire configuration of an information processing system according to an embodiment of the present invention.

First, a block diagram showing the entire configuration of an information processing system according to the present embodiment is shown in FIG. 1.

Each host 100 is a computer equipped with a central processing unit (CPU), a memory, an input/output device, and the like, and provides various kinds of information processing services. The information processing services provided by the host 100 include, for example, automatic teller services of banks, online services such as web page browsing services of the Internet, and, batch processing services for conducting experimental simulations in the science and technology field.

Each host 100 is connected to storage systems (storage devices A to C) 600 through a storage area network (SAN) 500. The storage systems 600 provide storage resources necessary when the hosts 100 provide information processing services. The storage resources are stored in logical volumes (hereinafter, also referred to as "volumes"), which are memory areas logically set in physical memory areas offered by disk drives provided in the storage systems 600. As the disk drives, various kinds of devices, for example, hard disk devices, flexible disk devices, semiconductor memory devices, and the like, can be used.

A management server (information processing device) 200 is connected to the hosts 100 and the storage systems 600 through a LAN 400, and constitutes the information processing system in association with the storage systems 600 and the hosts 100. The management server 200 is a computer for maintaining and managing the information processing system. For example, the management server 200 is used for creating or deleting a logical volume on a storage system 600, changing the capacity of a storage system 600, determining various kinds of settings for enabling a storage system 600 to be used from a host 100, and the like. Such maintenance and management is conducted by executing commands inputted into the management server 200 by an operator.

A storage management information database 210 is a database in which various kinds of management information on the storage systems 600 is stored. The storage management information database 210 is appropriately referred to or updated when the commands are executed. The storage management information database 210 can be constructed on a storage device 208 constituting the management server 200, or can be constructed on a data storage device other than the management server 200, for example, on a storage system 600.

The LAN 400 can be a public network such as the Internet, or can be a private network. Alternatively, a host 100 may be equipped with capabilities of the management server 200 so that the maintenance, management, and the like of the information processing system can be conducted from the host 100.

Figure 2:
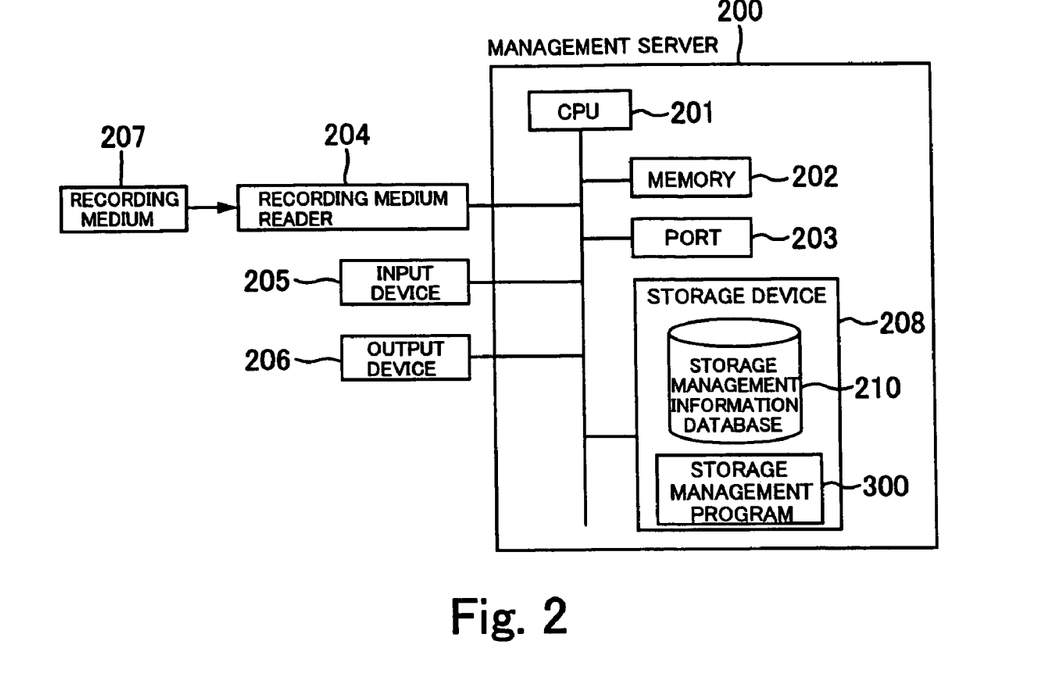
FIG. 2 is a block diagram showing the configuration of a management server according to the embodiment.

Next, a block diagram showing the configuration of the management server 200 according to the present embodiment is shown in FIG. 2.

The management server 200 is equipped with a CPU 201, a memory 202, a port 203, a recording medium reader 204, an input device 205, an output device 206, and the storage device 208.

The CPU 201 controls the whole of the management server 200, and realizes various kinds of capabilities according to the present embodiment by appropriately loading a storage management program 300 stored on the storage device 208 into the memory 202 and executing the storage management program 300. The recording medium reader 204 is a device for reading a program or data recorded on a recording medium 207. The read program or data is stored on the memory 202 or the storage device 208. Therefore, for example, the storage management program 300 recorded on the recording medium 207 can be read from the recording medium 207 using the recording medium reader 204 to be stored on the memory 202 or the storage device 208. As the recording medium 207, a flexible disk, a CD-ROM, a DVD-ROM, a semiconductor memory, and the like can be used. The recording medium reader 204 can be incorporated in the management server 200 or can be externally attached to the management server 200. On the storage device 208, the storage management program 300 and the storage management information database 210 are stored. The storage device 208 is, for example, a hard disk device, a flexible disk device, a semiconductor memory device, or the like. The input device 205 is used for inputting a command or the like into the management server 200 by the operator or the like. As the input device 205, for example, a keyboard, a mouse, or the like is used. The output device 206 is a device for outputting information to the outside. As the output device 206, for example, a display, a printer, or the like is used. The port 203 is a device for communicating with the hosts 100 and the storage systems 600. Moreover, the port 203 can be also used for communicating with other computer (not shown). In this case, for example, the storage management program 300 can be also received from other computer through the port 203 to be stored on the memory 202 or the storage device 208.

The storage management program 300 is a program for maintaining and managing the information processing system. The storage management program 300 accepts the input of a command from the operator, thus, for example, creating or deleting a logical volume of a storage system 600 or controlling access from a host 100 to a storage system 600. The storage management program 300 includes a plurality of processing blocks. A processing block is a unit of a process executed when a command is executed. For example, the processing block can be a function or a procedure for realizing a predetermined capability. These processing blocks are executed in accordance with a command. The processing blocks include one which outputs log data.

Log data is utilized for various purposes, such as for determining the cause when an error has occurred, and outputted in large amounts. However, not all log data are necessary. The necessity or non-necessity of log data depends on the degree of importance of an executed command and executed processing blocks. For example, there are cases where as many log data as possible are desired to be outputted, such as the case where an important command in maintaining and managing the information processing system is executed or the case where an anomaly has occurred in the information processing system. On the other hand, there are cases where log data are not desired to be outputted when an unimportant command is executed. Moreover, in a large-scale information processing system, a large amount of log data is acquired. Therefore, there are cases where the lack of processing power and the like for the original maintenance and management services thereof become problems due to the processing loads for the reservation of a memory area for recording the log data and for the acquisition of the log data.

Therefore, the storage management program 300 according to the present embodiment determines whether the output of log data is necessary or not, in accordance with the type of a command inputted into the management server 200 and the processing blocks executed in response to the command.

Figure 3:
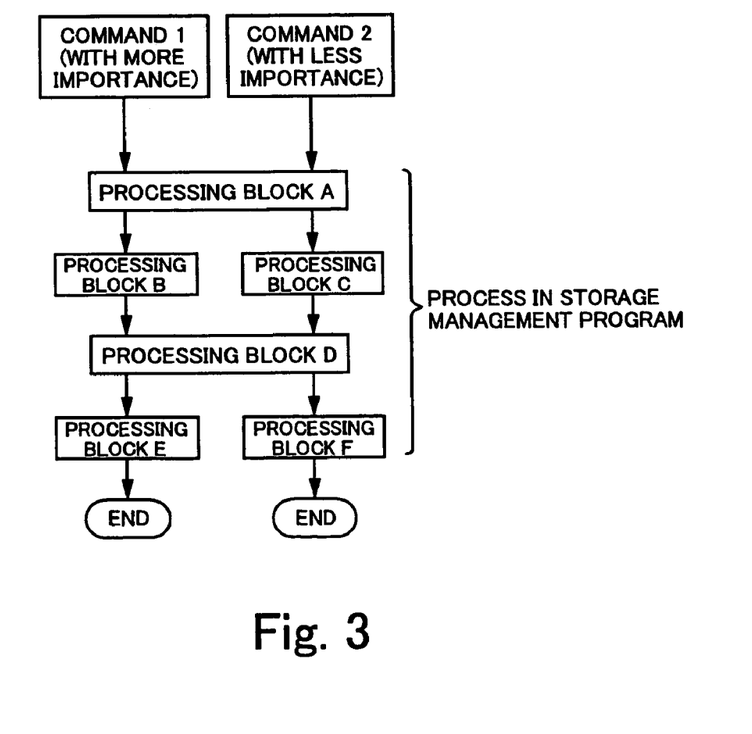
FIG. 3 is a diagram showing processing flows of commands according to the embodiment.

FIG. 3 shows a diagram for explaining a process of outputting log data according to the present embodiment.

Commands 1 and 2 represent commands to be inputted into the management server 200. Command 1 is a command having more importance, and command 2 is a command having less importance. Examples of commands having more importance are a command for newly setting a logical volume on a storage system 600, and the like. In the case where such a command having more importance is executed, there is more necessity of log data. This is because the log data may be necessary for determining the cause in the case where a logical volume has failed to be set, and the like. On the other hand, commands having less importance include, for example, a command for referring to the configuration of a logical volume of a storage system 600. In the case where such a command having-less importance is executed, there is less necessity of log data.

As shown in FIG. 3, for command 1 inputted into the management server 200, a plurality of processing blocks are sequentially executed by the storage management program 300. In the example of FIG. 3, the plurality of processing blocks are processing blocks A, B, D, and E. On the other hand, when command 2 is executed, processing blocks A, C, D, and F, are executed.

In the storage management program 300 according to the present embodiment, a determination value which is set for each type of command is used for determining whether the output of log data to be outputted by executing a processing block is necessary or not. Moreover, the result of determining whether the determination value satisfies a log data output condition set for the relevant processing block is stored, and the output of the log data is switched between necessity and non-necessity in accordance with the result. That is, in the case where a given processing block is executed in the execution of a given command, if the threshold level (determination value) of each command type stored in an output threshold definition table 360 sorted by command type shown in FIG. 6 is equal to or lower than the level of each processing block (log data output condition) stored in a log level definition table 350 shown in FIG. 5, log data is outputted. The result of determining whether the log data output condition is satisfied or not can be stored on the memory 202, or can be stored on a register in the CPU 201.

Figure 5:
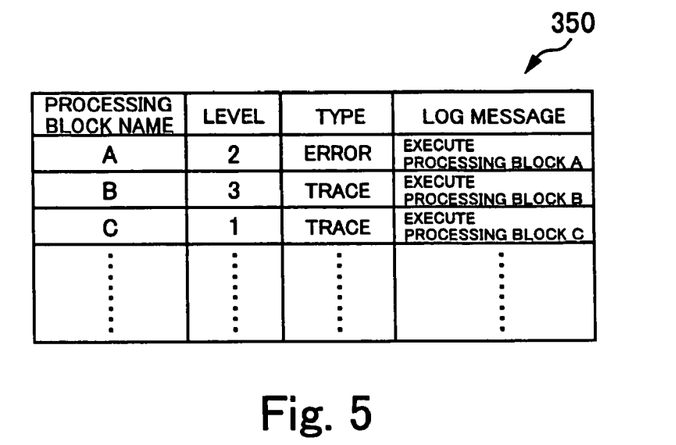
FIG. 5 is a view showing a log level definition table according to the embodiment.
Figure 6:
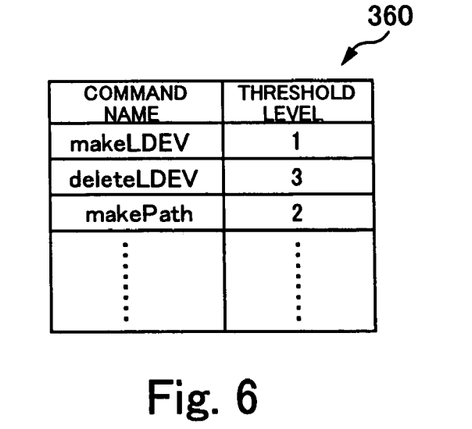
FIG. 6 is a view showing an output threshold definition table sorted by command type according to the embodiment.

The log level definition table 350 shown in FIG. 5 has a "process name" column, a "level" column, a "type" column, and a "log message" column. The "process name" column shows the name given to each processing block. For example, in the case where the processing block is a function, the name can be the function name. In the "level" column, the condition for outputting log data set for each processing block is described. In the present embodiment, if a value described in the "level" column is equal to or more than a threshold (determination value) set for each type of command, log data is outputted. The "type" column is a column for showing types of processing blocks. "Error" means that the relevant processing block is a processing block executed when an error has occurred (when it has been detected that an anomaly has occurred in the information processing system). "Trace" means that the relevant processing block is an ordinary processing block. The "log message" column is a column for recording log data to be outputted.

The output threshold definition table 360 sorted by command type shown in FIG. 6 has a "command name" column and a "threshold level" column. In the "command name" column, the names of commands executed by the management server 200 are described for the respective types. The command "makeLDEV" shown as an example in FIG. 6 is a command for setting a logical volume on a storage system 600. Moreover, the command "deleteLDEV" is a command for deleting a logical volume set on a storage system 600. Further, the command "makePath" is a command for setting a logical volume accessible from a host 100 by associating the logical volume with the host 100. The "threshold level" column is a column for describing thresholds (determination values) set for respective commands.

Figure 7:
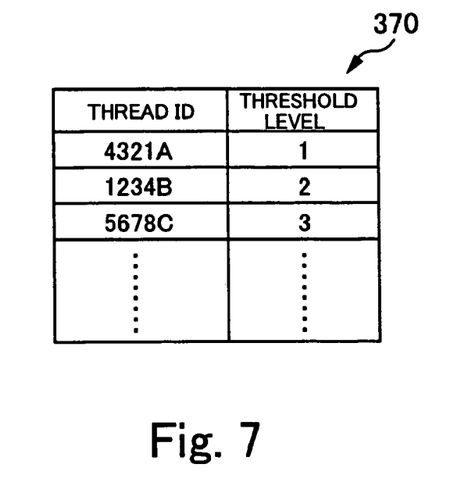
FIG. 7 is a view showing a thread information table according to the embodiment.

The log level definition table 350 and the output threshold definition table 360 sorted by command type can be also recorded on the memory 202 provided, in the management server 200, or can be stored in the storage management information database 210. Incidentally, the output threshold definition table 360 sorted by command type can be replaced with a thread information table 370 shown in FIG. 7. The thread information table 370 is a table in which a thread number given to a command by an operating system when the command is executed is associated with the threshold level of the command. A thread number is given to a command every time the command is executed. Accordingly, for example, in the case where the same command is executed a plurality of times, a different thread number is given to the command every time the command is executed. In the thread information table 370, threshold levels corresponding to commands identified by thread numbers are described for the respective thread numbers.

As described above, in the present embodiment, whether a determination value described in the output threshold definition table 360 sorted by command type or the thread information table 370 satisfies a log data output condition described in the log level definition table 350 or not is determined. In this way, in the example shown in FIG. 3, for example, though both commands 1 and 2 execute process A, control can be performed so that log data is outputted when process A is executed by command 1 but that log data is not outputted when process A is executed by command 2.

Figure 4:
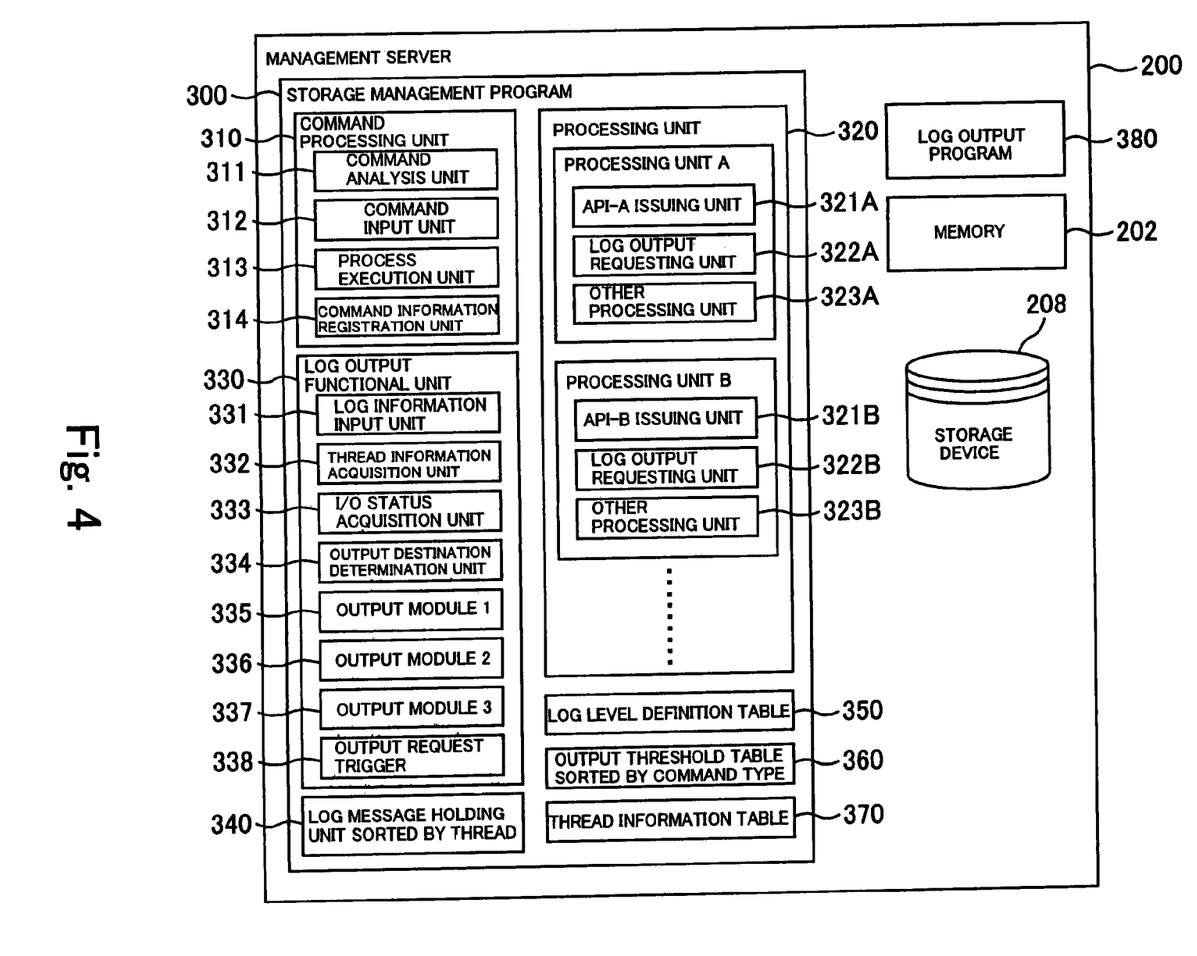
FIG. 4 is a diagram showing functional blocks of the management server according to the embodiment.

Next, a diagram showing functional blocks of the management server according to the present embodiment is shown in FIG. 4. The management server 200 has the storage management program 300, a log output program 380, the memory 202, and the storage device 208. The storage management program 300 and the log output program 380 are stored on the storage device 208 and appropriately loaded into the memory 202 to be executed by the CPU 201. When these programs are executed by the CPU 201, the programs are respectively executed as different processes by the operating system. That is, the storage management program 300 is executed as a first process, and the log output program 380 is executed as a second process. Here, a process means a control unit of the operating system which is generated when a program is executed. Processes are executed as if the CPU 201 is virtually allocated to each process.

The storage management program 300 has a command processing unit 310, a processing unit 320, a log output functional unit 330, a log message holding unit 340 sorted by thread, the log level definition table 350, the output threshold definition table 360 sorted by command type, and the thread information table 370.

The command processing unit 310 accepts a command inputted from the input device 205 or the like of the management server 200 by the operator. The command processing unit 310 has a command input unit 312, a command analysis unit 311, a process execution unit 313, and a command information registration unit 314. The command input unit 312 accepts the command inputted from the input device 205 or the like of the management server 200 by the operator. The command analysis unit 311 identifies the contents of the accepted command. The process execution unit 313 directs the processing unit 320 to execute a process in accordance with the contents of the command. The command information registration unit 314 acquires the thread number given to each command by the operating system or the like and registers the thread number in the thread information table 370.

The processing unit 320 is a unit for executing a command. The processing unit 320 has a plurality of processing blocks, such as processing units A and B, corresponding to the contents of a process. Each processing block has an application program interface (API) issue unit 321, a log output request unit 322, and other processing unit 323. The API issue unit 321 has a capability to issue an API in accordance with the contents of the process. Moreover, the API is issued in accordance with an individual storage system 600. The log output request unit 322 has a capability to direct the log output functional unit 330 to output log data when the relevant processing block has been executed. The other processing unit 323 has a capability to perform various kinds of control other than the above.

The log output functional unit 330 accepts a log data output request from the processing unit 320 to output log data. The log output functional unit 330 has a log information input unit 331, a thread information acquisition unit 332, an I/O status acquisition unit 333, an output destination determination unit 334, output module 1 (335), output module 2 (336), output module 3 (337), and an output request trigger 338. The log information input unit 331 refers to the log level definition table 350 to acquire the level, type, and log message corresponding to a processing block which has requested the output of the log data. The thread information acquisition unit 332 acquires a thread ID from the operating system and acquires the threshold level corresponding to the relevant thread ID from the thread information table 370.

The I/O status acquisition unit 333 measures respective processing loads, of modules A to C in output module 1 (335), which is the processing block executed when the log data is outputted to the storage device 208. Each of processing modules A to C has a capability to control the output of data to the storage device 208. For example, each processing module manages a queue for outputting data, and data waiting to be outputted are accumulated in the queue in the case where the processing load is heavy. A processing load is measured by measuring the speed of response to an instruction to write data to the storage device 208 for each processing module. As the amount of data waiting to be outputted which are accumulated in a queue increases, the speed of response to an instruction to write data generally decreases. Therefore, in the present embodiment, the speed of response is measured by measuring the response time from when an instruction to write data is transmitted from each processing module to the storage device 208 until a response to the write instruction is received. When the instruction to write data is transmitted, it is also possible to transmit not only the write instruction but also data to be actually written.

The output destination determination unit 334 determines whether the storage management program 300 outputs the log data to the storage device 208 for itself or causes the log output program 380 to output the log data to the storage device 208. The determination is made based on whether the result of measurement by the I/O status acquisition unit 333 satisfies a condition for outputting the log data to the storage device 208 or not. For example, in the case where the response time measured by the I/O status acquisition unit 333 is shorter than a specified time (the speed of response is faster than a specified speed), it is determined that the output condition is satisfied, and the storage management program 300 outputs the log data to the storage device 208 for itself. On the other hand, in the case where the response time measured by the I/O status acquisition unit 333 is longer than the specified time, it is determined that the output condition is not satisfied, and the storage management program 300 causes the log output program 380 to output the log data to the storage device 208. Thus, in the case where the output of the log data to the storage device 208 is expected to take time, the storage management program 300 causes the log output program 380 to output the log data, thereby being able to execute processes for the original maintenance and management services thereof. Moreover, in the case where the storage management program 300 outputs the log data for itself, a determination is also made as to which of modules A to C outputs the log data. Which of modules A to C outputs the log data can be decided by selecting the module having the lightest processing load, which has been measured by the I/O status acquisition unit 333. For example, the module having a response time which is shorter than the specified time and which is the shortest among the response times measured by the I/O status acquisition unit 333 is selected. This enables the log data to be outputted by the module which is expected to be capable of outputting the log data to the storage device 208 the fastest. This makes it possible to quickly output the log data.

Figure 8:
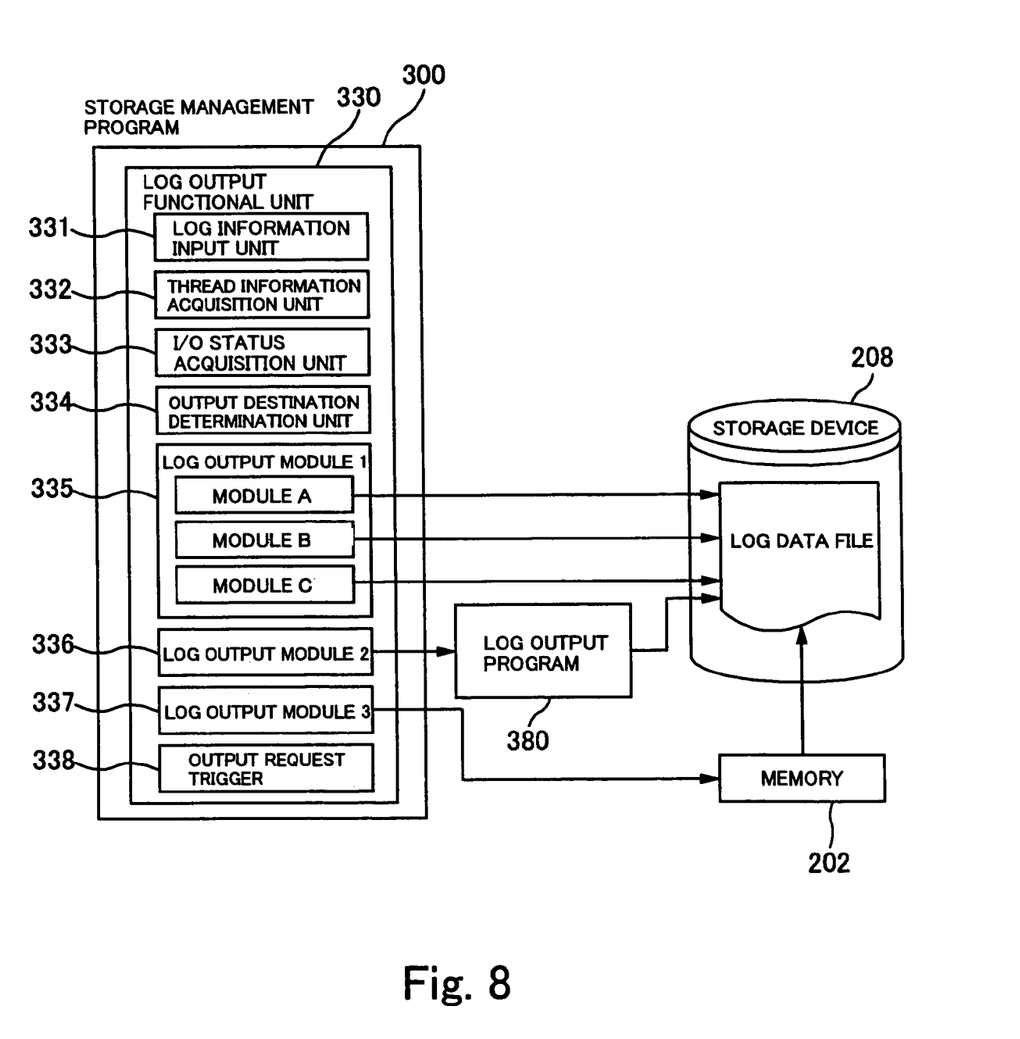
FIG. 8 is a diagram for explaining a method for outputting log data according to the embodiment.

Each of output modules 1, 2, and 3 (335, 336, and 337) is a processing block executed when the log data is outputted. A diagram showing how the log data is outputted by each processing module is shown in FIG. 8. In the case where the log data is outputted by output module 1 or 2 (335 or 336), the log data is outputted to the storage device 208. In the case where the log data is outputted by output module 1 (335), the storage management program 300 performs output to the storage device 208 for itself. In the case where the log data is outputted by output module 2 (336), the log output program 380 is executed, whereby output to the storage device 208 is performed. In the case where the log data is outputted by output module 1 (335), since the storage management program 300 directly outputs the log data, there is no limitation in the size of the log data, and therefore even log data having a large data size can be outputted. Moreover, since the storage management program 300 performs output for itself, the log data can be certainly written to the storage device 208. In the case where the log data is outputted by output module 2 (336), the storage management program 300 can perform the original maintenance and management services thereof while the log data is being outputted by the log output program 380.

In the case where the log data is outputted by output module 3 (337), the log data is outputted not to the storage device 208 but to the memory 202. For example, in the case where a given processing block is executed in the execution of a given command, if the threshold level (determination value) of the command stored in the output threshold definition table 360 sorted by command type shown in FIG. 6 is not equal to or less than the level of the processing block stored in the log level definition table 350 shown in FIG. 5 (when not satisfying the log data output condition), log data is not outputted to the storage device 208 but stored on the memory 202. Further, when it has been detected that an anomaly has occurred in the information processing system, the log data stored on the memory 202 is outputted to the storage device 208.

Figure 9:
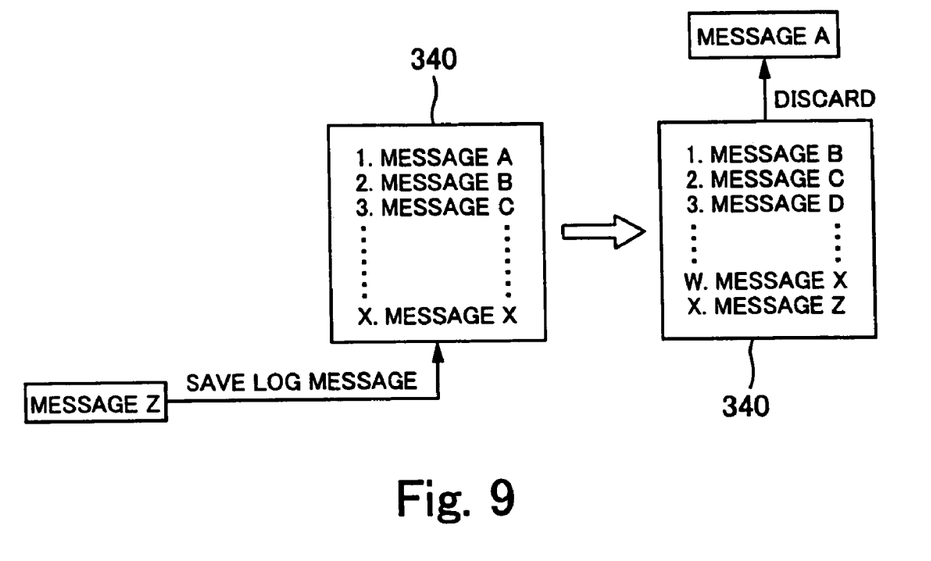
FIG. 9 is a diagram for explaining a process of storing log data in a memory according to the embodiment.
Figure 10:
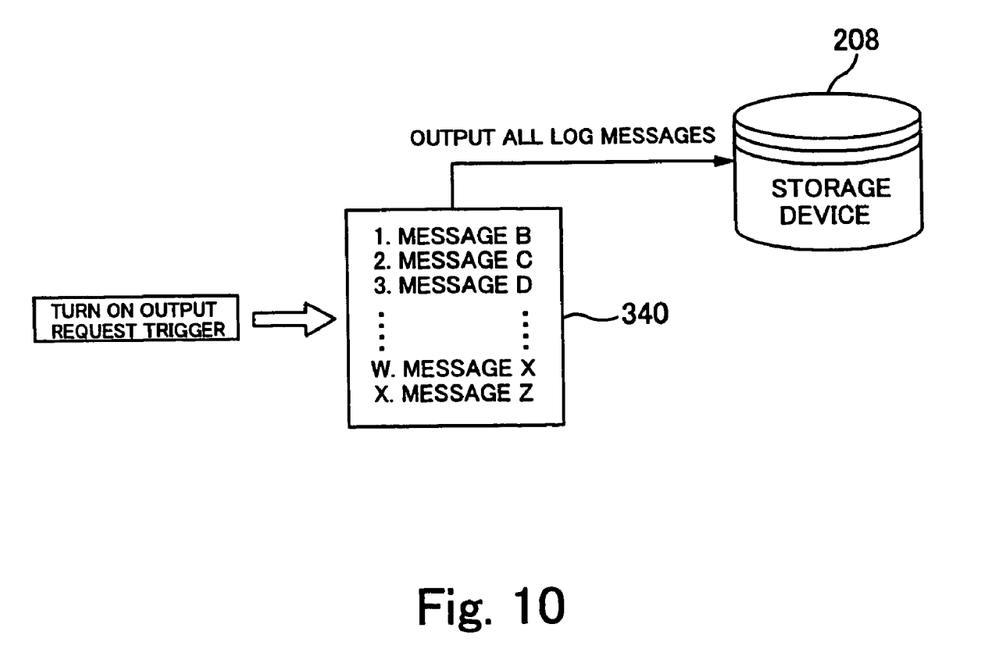
FIG. 10 is a diagram for explaining a process of outputting the log data stored on the memory according to the embodiment.

Diagrams showing the above-described control are shown in FIGS. 9 and 10. FIG. 9 shows the following case: a given processing block is executed, whereby "message Z," which is log data, is outputted. Since "message Z" does not satisfy the log data output condition, "message Z" is not outputted to the storage device 208 but stored on the memory 202. On the memory 202, the log message holding unit 340 sorted by thread, which is a memory area for storing log data, is provided. In the log message holding unit 340 sorted by thread, "message A" to "message X" have already been stored. In the case where an empty area for storing log data exists in the log message holding unit 340 sorted by thread on the memory 202, "message Z" is written to the empty area in the log message holding unit 340 sorted by thread. However, in the case where no empty area exists, "message Z" is newly stored but "message A" is discarded as shown in FIG. 9. "Message A" is the oldest log data among "message A" to "message X" written to the log message holding unit 340 sorted by thread on the memory 202. Incidentally, the log message holding unit 340 sorted by thread is provided for each command or for each thread. Therefore, if, there is an empty area in the memory area of a log message holding unit 340 sorted by thread for storing log data outputted by executing other command or thread but there is no empty area in the memory area of the log message holding unit 340 sorted by thread for storing log data outputted by executing the relevant command or thread, a message is discarded. This makes it possible to store the log data from the present to a given point in the past for each command or thread. Moreover, when it has been detected that an anomaly has occurred in the information processing system, the log data stored in the log message holding unit 340 sorted by thread on the memory 202 is outputted to the storage device 208. The situation thereof is shown in FIG. 10. When it has been detected that an anomaly has occurred in the information processing system, an output trigger 338, described later, is turned ON. This allows the log data stored in the log message holding unit 340 sorted by thread on the memory 202 to be outputted to, the storage device 208. The log data to be outputted can be the log data stored in the log message holding unit 340 sorted by thread for storing the log data outputted by executing a command or thread which has caused the anomaly, or can be the log data stored in all the log message holding units 340 sorted by thread. This makes it possible to output the log data from the time of anomaly occurrence to a given point in the past when an anomaly has occurred in the information processing system. Therefore, the log data can be utilized for determining the cause of anomaly occurrence. On the other hand, when an anomaly does not occur, old log data are sequentially discarded, and therefore, unnecessary log data are not stored.

Figure 11:
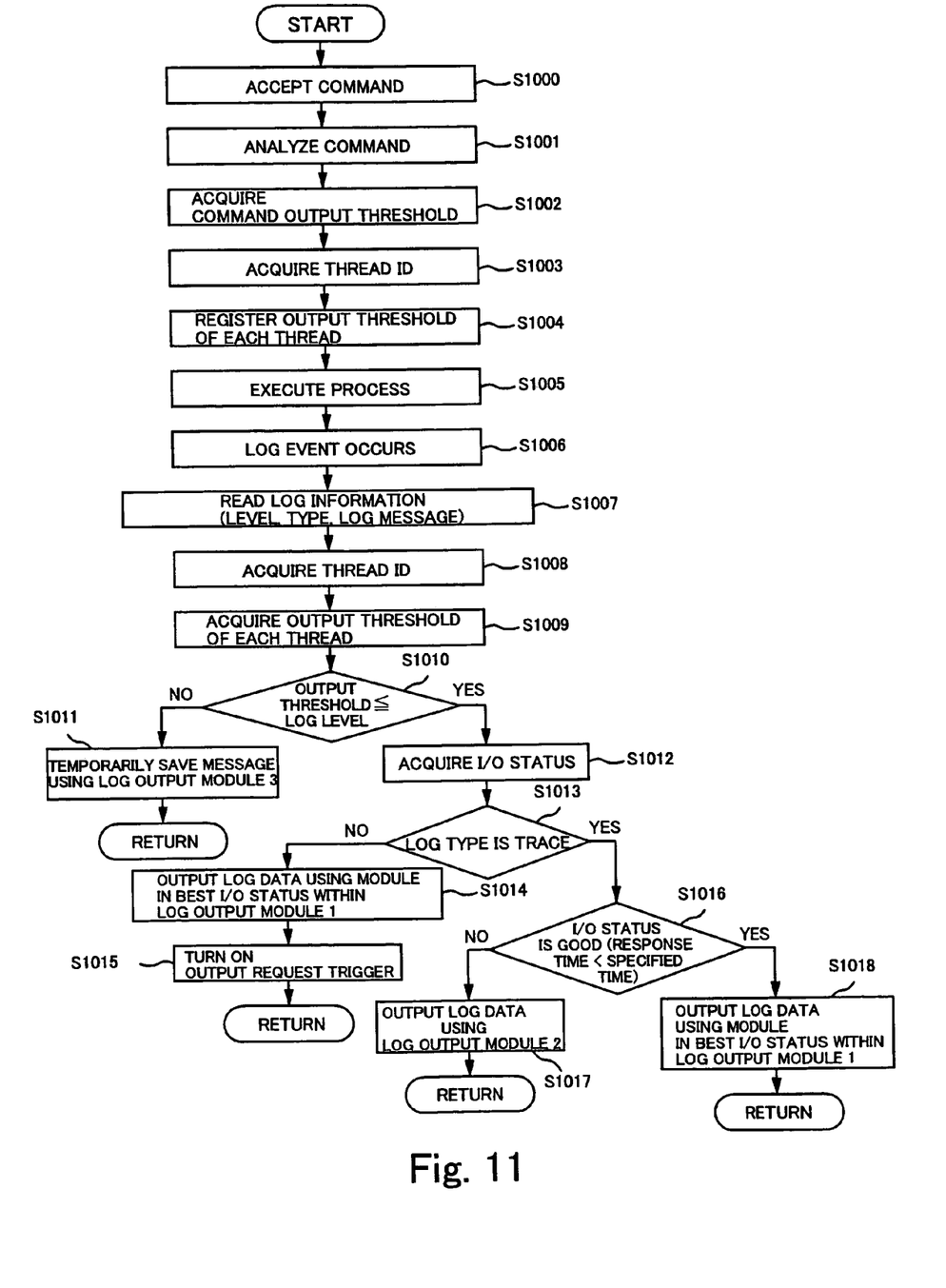
FIG. 11 is a flowchart showing a flow of a process according to the embodiment.

Next, a flowchart showing a flow of a process according to the present embodiment is shown in FIG. 11. Note that the CPU 201 executes the storage management program 300 including codes for performing various kinds of operations according to the present embodiment, whereby the process below is realized.

First, a command is accepted by the command input unit 312 (S1000). The command can be inputted using the input device 205 by an operator operating the management server 200, or one generated by an internal process of the management server 200 can be accepted as the command. Subsequently, the command is analyzed by the command analysis unit 311 (S1001). Next, the threshold (determination value) of the accepted command is acquired by the command information registration unit 314 (S1002). The threshold is acquired by referring to the output threshold definition table 360 sorted by command type. Next, a thread ID is acquired (S1003). The thread ID can be acquired by inquiring of the operating system. Then, the threshold of the command acquired in S1002 and the thread ID acquired in S1003 are registered in the thread information table 370 (S1004).

Next, the process execution unit 313 directs the processing unit 320 to execute a process corresponding to the command, whereby the execution of the process is started (S1005). The process corresponding to the command is executed by executing a processing block. When the processing block which outputs log data is executed (S1006), the log output requesting unit 322 directs the log output functional unit 330 to output the log data. The log information input unit 331 refers to the log level definition table 350, thereby reading log information (S1007). The log information contains the level, type, and log message of the log data. Then, the thread information acquisition unit 332 acquires the thread ID of the thread having executed the processing block which outputs the log data (S1008), and then refers to the thread information table 370, thereby acquiring the threshold level set for the relevant thread (S1009).

The output destination determination unit 334 compares the level of the log data acquired in S1007 and the threshold level set for the thread acquired in S1009 (S1010). If the former is smaller, the process is proceeded to "No," and output module 3 (337) is directed to output the log data (S1011). Output module 3 (337) stores the log data in the log message holding unit 340 sorted by thread set on the memory 202.

On the other hand, if the former is larger in S1010, the process proceeds to "Yes," and a process for outputting the log data to the storage device 208 is performed. First, the I/O status acquisition unit 333 measures the respective processing loads of modules A to C in output module 1 (335) which is the processing block executed when the log data is outputted to the storage device 208 (S1012). Each processing load is measured by, for example, measuring the response time from when an instruction to write data is transmitted from each processing module to the storage device 208 until a response to the write instruction is received. Subsequently, the output destination determination unit 334 determines the type of the log data (S1013). The type of the log data can be known from the log information acquired in S1007. If the type of the log data is "error," the process is proceeded to "No," and log output module 1 (335) is directed to output the log data (S1014). Log output module 1 (335) causes the module having the lightest processing load to output the log data, based on the respective processing loads of modules A to C measured by the I/O status acquisition unit 333 in S1012. If the type of the log data is "error," the information processing system is in a state where an anomaly has occurred therein. Therefore, the storage management program 300 outputs the log data using log output module 1 (335), thereby making it possible to certainly output the log data to the storage device 208. Moreover, in order to output the log data as quickly as possible, the module having the lightest processing load among modules A to C is caused to output the log data. This enables the log data to be outputted quickly. Subsequently, the output destination determination unit 334 turns ON the output request trigger 338 (S1015). When output module 3 (337) detects that the output request trigger 338 has been turned ON, output module 3 (337) outputs the log data stored in the log message holding unit 340 sorted by thread set on the memory 202 to the storage device 208. This makes it possible to output all log data from the time of anomaly occurrence to a given point in the past when an anomaly has occurred in the information processing system. Therefore, the log data can be utilized for determining the cause of anomaly occurrence.

If the type of the log data is "trace" in S1013, the process proceeds to "Yes." Then, based on the respective processing loads of modules A to C measured by the I/O status acquisition unit 333 in S1012, the output destination determination unit 334 determines whether the log data is outputted by output module 1 (335) or output module 2 (336) (S1016). If the shortest response time among the response times of modules A to C from the storage device 208 is longer than the specified time, the process is proceeded to "No," and log output module 2 (336) is caused to output the log data (S1017). In the case where all of the response times of modules A to C from the storage device 208 are longer than the specified time, it can be supposed that all of modules A to C have heavy processing loads. Therefore, it is supposed that any module takes a long time to transmit the log data. If the storage management program 300 directly transmits the log data, the storage management program 300 cannot perform the original maintenance and management services thereof during that period. Accordingly, the storage management program 300 causes the log data output program 380 to output the log data. Since the log output program 380 is executed as a process different from that of the storage management program 300 by the CPU 201, the storage management program 300 can perform the original maintenance and management services thereof during the time the log data is being outputted by the log output program 380. On the other hand, if the shortest response time among the respective response times of modules A to C from the storage device 208 is shorter than the specified time, the process is proceeded to "Yes," and log output module 1 (335) is directed to output the log data (S1018). Log output module 1 (335) causes the module having the lightest processing load to output the log data, based on the respective processing loads of modules A to C measured by the I/O status acquisition unit 333 in S1012. This makes it possible to output the log data by the module expected to be capable of outputting the log data to the storage device 208 the fastest. Moreover, since the storage management program 300 directly outputs the log data, there is no limitation in the size of the log data, and therefore even large log data can be outputted. Furthermore, since the storage management program 300 outputs for itself, the log data can be certainly outputted to the storage device 208.

The above-described process makes it possible to output log data in accordance with the type of a command and a process block executed in response to the command in the following manner: when a processing block containing an algorithm for outputting the log data is executed, whether the determination value which is set for each type of command and which is used to determine whether the output of the log data to be outputted by executing the processing block is necessary or not satisfies the log data output condition set for the relevant processing block or not is determined by comparing the log data output level of each processing block registered in the log level definition table 350 and the threshold set for each command registered in the output threshold definition table 360 sorted by command type or the thread information table 370.

Moreover, in the case where log data is expected to take a long time to be outputted to the storage device 208, the log output program 380 is caused to output the log data, whereby the storage management program 300 can execute processes for the original maintenance and management services thereof.

Further, in the case where log data is outputted by output module 1 (335), the storage management program 300 directly outputs the log data. Therefore, there is no limitation in the size of the log data, and even large log data can be outputted. In addition, since the storage management program 300 outputs the log data for itself, the log data can be certainly outputted to the storage device 208. On the other hand, in the case where the log data is outputted by output module 2 (336), the storage management program 300 can perform the original maintenance and management services during the time the log data is being outputted by the log output program 380. Therefore, it is possible to avoid reducing processing performances for the maintenance and management services.

Moreover, since the module having the lightest processing load among modules A to C is caused to output log data, the log data can be outputted by-the module expected to be capable of outputting the log data to the storage device 208 the fastest. This makes it possible to quickly output the log data.

Further, log data having less importance are once stored on the memory 202, and the log data are outputted to the storage device 208 when it has been detected that an anomaly has occurred in the information processing system. This makes it possible to output all log data from the time of anomaly occurrence to a given point in the past, if an anomaly has occurred in the information processing system. Therefore, the log data can be utilized for determining the cause of anomaly occurrence. In the case where an anomaly does not occur, the log data stored on the memory 202 are discarded in order of the length of time for which they have been stored thereon. Accordingly, unnecessary log data are not stored.

Although the preferred embodiment of the present invention has been described in detail, it should be understood that various changes, substitutions, and alterations can be made therein without departing from spirit and scope of the inventions as defined by the appended claims.

It is possible to provide a program, an information processing device, and a method for outputting log data in the information processing device.

Although the preferred embodiment of the present invention has been described in detail, it should be understood that various changes, substitutions and alterations can be made therein without departing from the spirit and scope of the invention as defined by the appended claims.

What is claimed is:

1. A computer-readable medium storing a computer software program for causing an information processing device in an information processing system to execute steps of:
  executing at least one processing block executed in common when at least two types of commands for controlling said information processing system are respectively executed;
  storing determination values set for the respective types of said commands, the determination values being used to determine whether log data to be outputted by executing said processing block needs to be outputted;
  storing results of determining whether said determination values satisfy a log data output condition set for the processing block when said processing block containing an algorithm for outputting said log data is executed;
  measuring processing loads of processing modules in said processing block each containing the algorithm for outputting the log data when said determination values satisfy said log data output condition set; and
  outputting the log data by the processing module having a lightest processing load among said processing modules of which said processing load have been measured.

2. A computer-readable medium according to claim 1, wherein said program further causing said information processing device to execute the step of:
  outputting the log data to a storage device provided in said information processing device, if the result of said determination indicates that said determination value satisfies said log data output condition.

3. A computer-readable medium according to claim 2,
  wherein a processing load of one of said processing modules executed when the log data is outputted to said storage device is measured, and
  wherein a first process is caused to output the log data to said storage device if a result of said measurement satisfies a condition for outputting the log data to said storage device, and a second process different from said first process is caused to output the log data to said storage device if the result of said measurement does not satisfy said condition.

4. A computer-readable medium according to claim 3,
  wherein the processing load of one of said processing modules executed when the log data is outputted to said storage device is measured by measuring a speed of response to an instruction to write data to said storage device, and wherein the condition for outputting the log data to said storage device is that said speed of response is faster than a specified speed.

5. A computer-readable medium according to claim 1, wherein said computer software program further causing said information processing device to execute the step of: storing the log data in a memory provided in said information processing device if the result of said determination indicates that said determination value does not satisfy said log data output condition, and outputting said log data stored in said memory to a storage device provided in said information processing device when it has been detected that an anomaly has occurred in said information processing system by executing said processing block.

6. An information processing device in an information processing system, said information processing device comprising:
   a section for executing at least one processing block executed in common when at least two types of commands for controlling said information processing system are respectively executed;
   a section for storing determination values set for the respective types of said commands, the determination values being used to determine whether log data to be outputted by executing said processing block needs to be outputted;
   a section for storing results of determining whether said determination values satisfy a log data output condition set for the processing block when said processing block containing an algorithm for outputting said log data is executed;
   a section for measuring processing loads of processing modules said processing block each containing the algorithm for outputting the log data when said determination values satisfy said log data output condition set; and
   a section for outputting the log data by the processing module having a lightest processing load among said processing modules of which said processing load have been measured.

7. An information processing device according to claim 6, further comprising a section for outputting the log data to a storage device provided in said information processing device, if the result of said determination indicates that said determination value satisfies said log data output condition.

8. An information processing device according to claim 7, wherein a processing load of one of said processing modules executed when the log data is outputted to said storage device is measured, and
   wherein a first process is caused to output the log data to said storage device if a result of said measurement satisfies a condition for outputting the log data to said storage device, and a second process different from said first process is caused to output the log data to said storage device if the result of said measurement does not satisfy said condition.

9. An information processing device according to claim 8, wherein the processing load of one of said processing modules executed when the log data is outputted to said storage device is measured by measuring a speed of response to an instruction to write data to said storage device, and wherein the condition for outputting the log data to said storage device is that said speed of response is faster than a specified speed.

10. An information processing device according to claim 6, further comprising a section for storing the log data in a memory provided in said information processing device if the result of said determination indicates that said determination value does not satisfy said log data output condition, and outputting said log data stored in said memory to a storage device provided in said information processing device when it has been detected that an anomaly has occurred in said information processing system by executing said processing block.

11. A method for outputting log data in an information processing device in an information processing system, the method comprising steps of:
   executing at least one processing block executed in common when at least two types of commands for controlling said information processing system are respectively executed;
   storing determination values set for the respective types of said commands, the determination values being used to determine whether the log data to be outputted by executing said processing block needs to be outputted;
   storing results of determining whether said determination values satisfy a log data output condition set for the processing block when said processing block containing an algorithm for outputting said log data is executed;
   measuring processing loads of processing modules said processing block containing the algorithm for outputting the log data when said determination values satisfy said log data output condition set; and
   outputting the log data by the processing module having a lightest processing load among said processing modules of which said processing load have been measured.

12. A method for outputting log data according to claim 11, further comprising the step of outputting the log data to a storage device provided in said information processing device, if the result of said determination indicates that said determination value satisfies said log data output condition.

13. A method for outputting log data according to claim 12,
   wherein a processing load of one of said processing modules executed when the log data is outputted to said storage device is measured, and
   wherein a first process is caused to output the log data to said storage device if a result of said measurement satisfies a condition for outputting the log data to said storage device, and a second process different from said first process is caused to output the log data to said storage device if the result of said measurement does not satisfy said condition.

14. A method for outputting log data according to claim 13,
   wherein the processing load of one of said processing modules executed when the log data is outputted to said storage device is measured by measuring a speed of response to an instruction to write data to said storage device, and
   wherein the condition for outputting the log data to said storage device is that said speed of response is faster than a specified speed.

15. A method for outputting log data according to claim 11, further comprising the step of storing the log data in a memory provided in said information processing device if the result of said determination indicates that said determination value does not satisfy said log data output condition, and outputting said log data stored in said memory to a storage device provided in said information processing device when it has been detected that an anomaly has occurred in said information processing system by executing said processing block.

* * * * *